United States Patent
Pao et al.

(10) Patent No.: US 9,999,097 B2
(45) Date of Patent: Jun. 12, 2018

(54) METHOD OF RADIO BEARER ESTABLISHMENT IN DUAL CONNECTIVITY

(71) Applicant: Industrial Technology Research Institute, Hsinchu (TW)

(72) Inventors: Wei-Chen Pao, New Taipei (TW); Chun-Chia Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days. days.

(21) Appl. No.: 15/709,492

(22) Filed: Sep. 20, 2017

(65) Prior Publication Data

US 2018/0014353 A1      Jan. 11, 2018

Related U.S. Application Data

(63) Continuation of application No. 14/453,633, filed on Aug. 7, 2014, now Pat. No. 9,807,818.

(60) Provisional application No. 61/863,493, filed on Aug. 8, 2013.

(51) Int. Cl.
*H04W 72/00*     (2009.01)
*H04W 88/06*     (2009.01)
*H04W 28/08*     (2009.01)
*H04W 72/04*     (2009.01)

(52) U.S. Cl.
CPC ........... *H04W 88/06* (2013.01); *H04W 28/08* (2013.01); *H04W 76/15* (2018.02); *H04W 72/04* (2013.01); *H04W 76/34* (2018.02); *H04W 76/38* (2018.02)

(58) Field of Classification Search
None
See application file for complete search history.

(56) References Cited

U.S. PATENT DOCUMENTS

| | | | |
|---|---|---|---|
| 2014/0293958 A1 | 10/2014 | Teyeb | |
| 2014/0335869 A1* | 11/2014 | Choi | H04W 36/0072 455/438 |
| 2015/0092554 A1* | 4/2015 | Mochizuki | H04W 76/046 370/235 |
| 2016/0142954 A1* | 5/2016 | Cho | H04W 36/0066 370/331 |

FOREIGN PATENT DOCUMENTS

| | | |
|---|---|---|
| EP | 2 291 048 A1 | 3/2011 |
| EP | 2 773 157 A1 | 9/2014 |
| TW | 201203969 | 1/2012 |
| TW | 201320678 | 5/2013 |
| WO | 2011053827 A1 | 5/2011 |
| WO | 2013075602 A1 | 5/2013 |

* cited by examiner

*Primary Examiner* — Idowu O Osifade
(74) *Attorney, Agent, or Firm* — Winston Hsu

(57) ABSTRACT

A method of radio bearer establishment in dual connectivity, for a first base station in a wireless communication system is disclosed. The method comprises determining whether to establish or release at least a radio bearer for the communication device on at least a second base station, transmitting a request message including information of the at least a radio bearer to be established or released on the at least a second base station, to the at least a second base station, and receiving a response message including information about accepting or rejecting establishment or release for the at least a radio bearer on the at least a second base station, from the at least a second base station.

14 Claims, 16 Drawing Sheets

METHOD OF RADIO BEARER ESTABLISHMENT IN DUAL CONNECTIVITY

CROSS REFERENCE TO RELATED APPLICATIONS

This application is a continuation of U.S. application Ser. No. 14/453,633 filed on Aug. 7, 2014, which claims the benefit of provisional Application No. 61/863,493 filed on Aug. 8, 2013.

BACKGROUND OF THE INVENTION

1. Field of the Invention

The present invention relates to a method used in a communication device in a wireless communication system, and more particularly, to a method of radio bearer establishment in dual connectivity.

2. Description of the Prior Art

3GPP in Release 12 proposes dual connectivity for increasing user's throughput. Dual connectivity to at least two cells may be served by different evolved NodeBs (eNB), linked with non-ideal backhaul, e.g., there may be an eNB in charge of a cluster of cells. Therefore, a user equipment (UE) may be served by multiple eNBs when it is in dual connectivity mode.

Under framework of the dual connectivity, a procedure of inter-node radio resource aggregation (INRRA) is proposed to build a UE's connection with more than one node. The INRRA can provide traffic load sharing between the network nodes and improve per-user throughput by utilizing radio resources in more than one node. In other words, the UE may receive different data and service from more than one network nodes. Note that, a node or a network node could be referred to an eNB in this article.

Moreover, different service and different data may have different quality of service (QoS) requirements. In INRRA, traffic streams may be split over more than one network node depending on QoS requirements of each traffic type, loading situation, channel condition, and the combination thereof. In other words, a radio bearer may exist on more than one network node. Multiple network nodes need to maintain the QoS of the radio bearers.

However, the applicant notices that there is no specification for radio bearer establishment on multiple network nodes. Therefore, data transmission/reception to/from more than one network nodes cannot be realized.

SUMMARY OF THE INVENTION

It is there for an objective to provide a method of radio bearer establishment in dual connectivity to solve the above problem.

The present invention discloses a method of radio bearer establishment in dual connectivity, for a first base station in a wireless communication system. The method comprises connecting to a communication device of the wireless communication system, determining whether to establish or release at least a radio bearer for the communication device on at least a second base station, transmitting a request message including information of the at least a radio bearer to be established or released on the at least a second base station, to the at least a second base station, and receiving a response message including information about accepting or rejecting establishment or release for the at least a radio bearer on the at least a second base station, from the at least a second base station, wherein the response message includes information of at least one of identities of radio bearers to be accepted or rejected to be established or released, release acknowledgement, information related to configuration of radio bearers on the at least a second base station, and information related to connection setup to the at least a second base station.

The present invention discloses a first base station of a wireless communication system for radio bearer establishment in dual connectivity. The first base station comprises a storage unit for storing instructions of: connecting to a communication device of the wireless communication system, determining whether to establish or release at least a radio bearer for the communication device on at least a second base station, and transmitting a request message including information of the at least a radio bearer to be established or released on the at least a second base station, to the at least a second base station, and receiving a response message including information about accepting or rejecting establishment or release for the at least a radio bearer on the at least a second base station, from the at least a second base station, wherein the response message includes information of at least one of identities of radio bearers to be accepted or rejected to be established or released, release acknowledgement, information related to configuration of radio bearers on the at least a second base station, and information related to connection setup to the at least a second base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
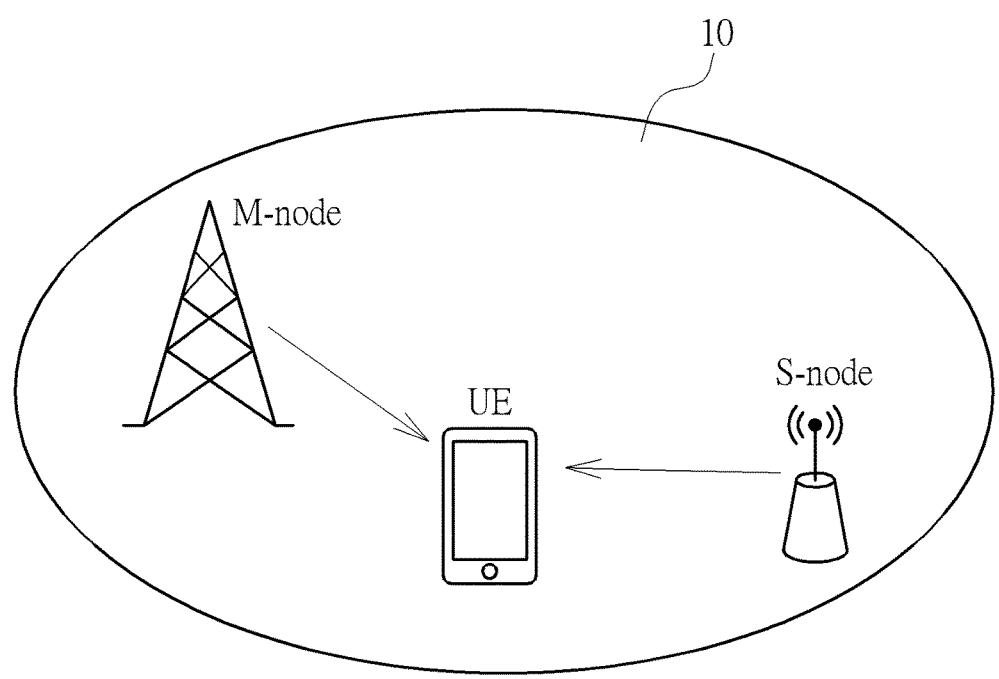
FIG. 1 illustrates a schematic diagram of a wireless communication system.

Please refer to FIG. 1, which is a schematic diagram of a wireless communication system 10. The wireless communication system 10 is a LTE/LTE-Advanced system or other mobile communication systems, and is briefly composed of at least two network nodes, i.e. an master eNB (hereafter called M-node) and a secondary eNB (hereafter called S-node), and a user equipment (UE). In dual connectivity, M-node terminates at least S1-MME and therefore acts as mobility anchor towards the core network including a Mobility Management Entity (MME). On the other hand, S-node provides additional radio resource for the UE, which is not the M-node. Note that, FIG. 1 is simply utilized for illustrating the structure of the wireless communication system 10, where the number of UEs and eNBs are not limited herein. The UEs can be devices such as mobile phones, computer systems, machine type devices, etc. Besides, the network node and the UE can be seen as a transmitter or receiver according to transmission direction, e.g., for uplink (UL), the UE is the transmitter and the network node is the receiver, and for downlink (DL), the network node is the transmitter and the UE is the receiver.

As shown in FIG. 1, the UE has a first radio resource control (RRC) connection with M-node. The first RRC connection includes at least a radio bearer (RB). The term RB may cover signaling radio bearer (SRB) and data radio bearer (DRB). Based on 3GPP specification of Radio Resource Control (RRC) protocol, SRB is defined as RB that is used only for the transmission of RRC and non-access stratum (NAS) message. DRB transports the packets of an enhanced packet system (EPS) bearer between a UE and an eNB. When a data radio bearer exists, there is one to one mapping between this DRB and the EPS bearer/E-UTRAN radio access bearer (E-RAB). An E-RAB uniquely identifies the concatenation of an S1 bearer and the corresponding DRB. When an E-RAB exists, there is a one to one mapping between this E-RAB and an EPS bearer of the NAS. An EPS bearer/E-RAB is the level of granularity for bearer level QoS control in the EPC/E-UTRAN. The bearer may be associated with QoS parameters. For example, QoS Class Identifier (QCI), Allocation and Retention Priority (ARP), Guaranteed Bit Rate (GBR), Maximum Bit Rate (MBR), per APN Aggregate Maximum Bit Rate (APN-AMBR), and per UE Aggregate Maximum Bit Rate (UE-AMBR).

Figure 2:
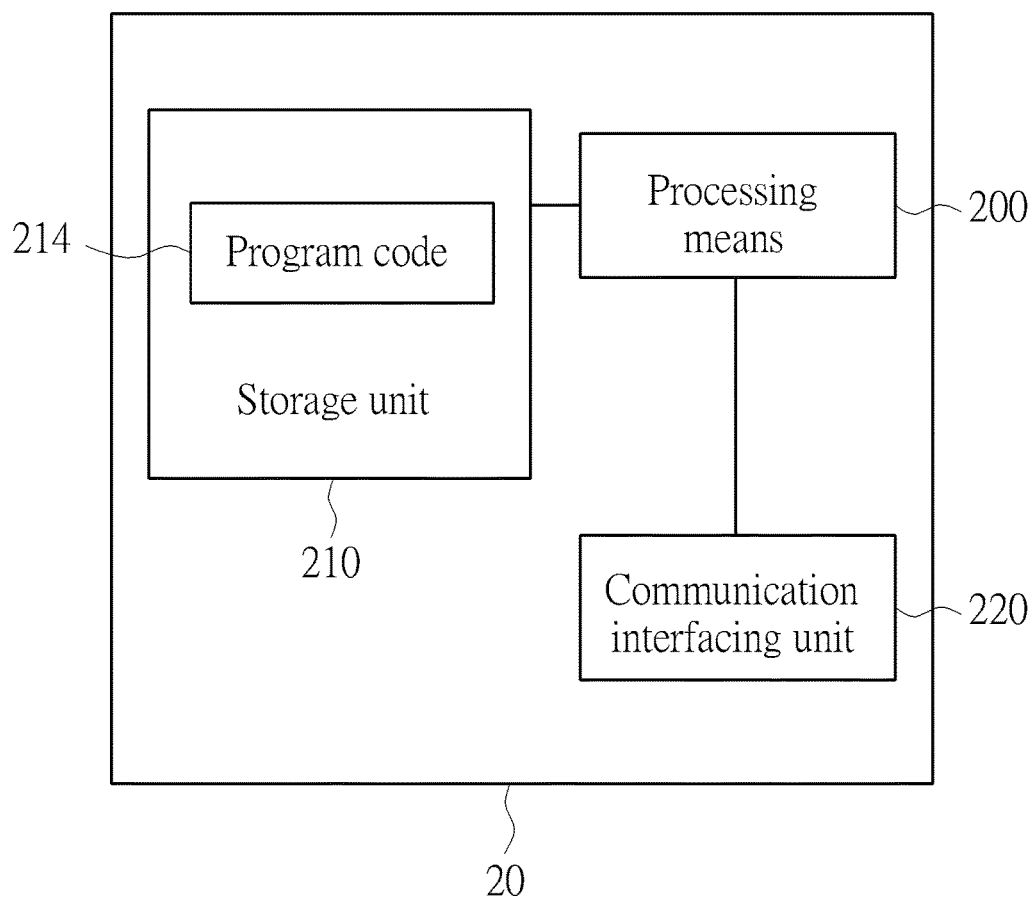
FIG. 2 illustrates a schematic diagram of an exemplary communication device.

FIG. 2 illustrates a schematic diagram of an exemplary communication device 20. The communication device 20 can be the UE, M-node, or S-node shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with a network (i.e. E-UTRAN) according to processing results of the processing means 200.

Figure 3:
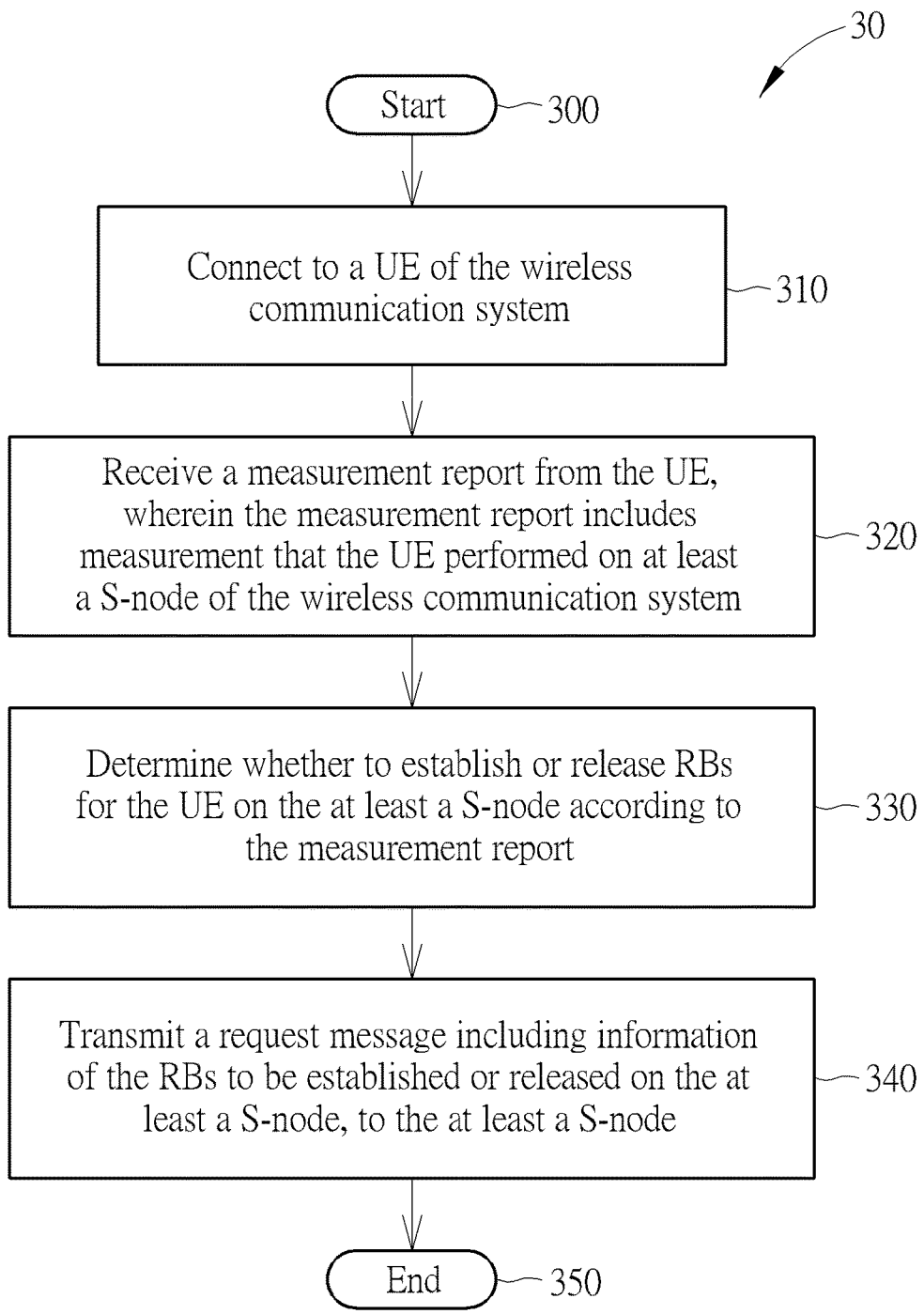
FIG. 3 is a flowchart of an exemplary process according to the present disclosure.

Please refer to FIG. 3, which is a flowchart of a process 30 according to an example of the present disclosure. The process 30 is utilized in the communication device 20 (i.e. the M-node in FIG. 1) for RB establishment in dual connectivity. The process 30 may be compiled into a program code 214 to be stored in the storage unit 210, and may include the following steps:

Step 300: Start.

Step 310: Connect to a UE of the wireless communication system.

Step 320: Receive a measurement report from the UE, wherein the measurement report includes measurement that the UE performed on at least a S-node of the wireless communication system.

Step 330: Determine whether to establish or release RBs for the UE on the at least a S-node according to the measurement report.

Step 340: Transmit a request message including information of the RBs to be established or released on the at least a S-node, to the at least a S-node.

Step 350: End.

According to the process 30, the UE connects to the M-node and transmits a measurement report associated to the at least a S-node to the M-node. In addition, the M-node asks one or more than one S-nodes to establish or release at least a RB with the request message according to the measurement report. More specific, the M-node may establish a new RB on S-nodes, or switch a subset of RBs, which is already established on the M-node, from M-node to other S-nodes. In an embodiment, the M-node may keep the switched RBs for data transmission/reception for the UE. Or, the M-node may release the switched RBs on the M-node.

Note that, the M-node may switch a subset of RBs for the UE from the M-node to the S-node, or release a subset of RBs because of QoS requirements of each traffic type, loading situation, channel condition, S-node connection failure, and the combination thereof. In addition, the M-node may switch a subset of RBs from a S-node back to the M-node, or release RBs on the S-node because the UE lose connection to the S-node due to movement or loading situation change.

Figure 4:
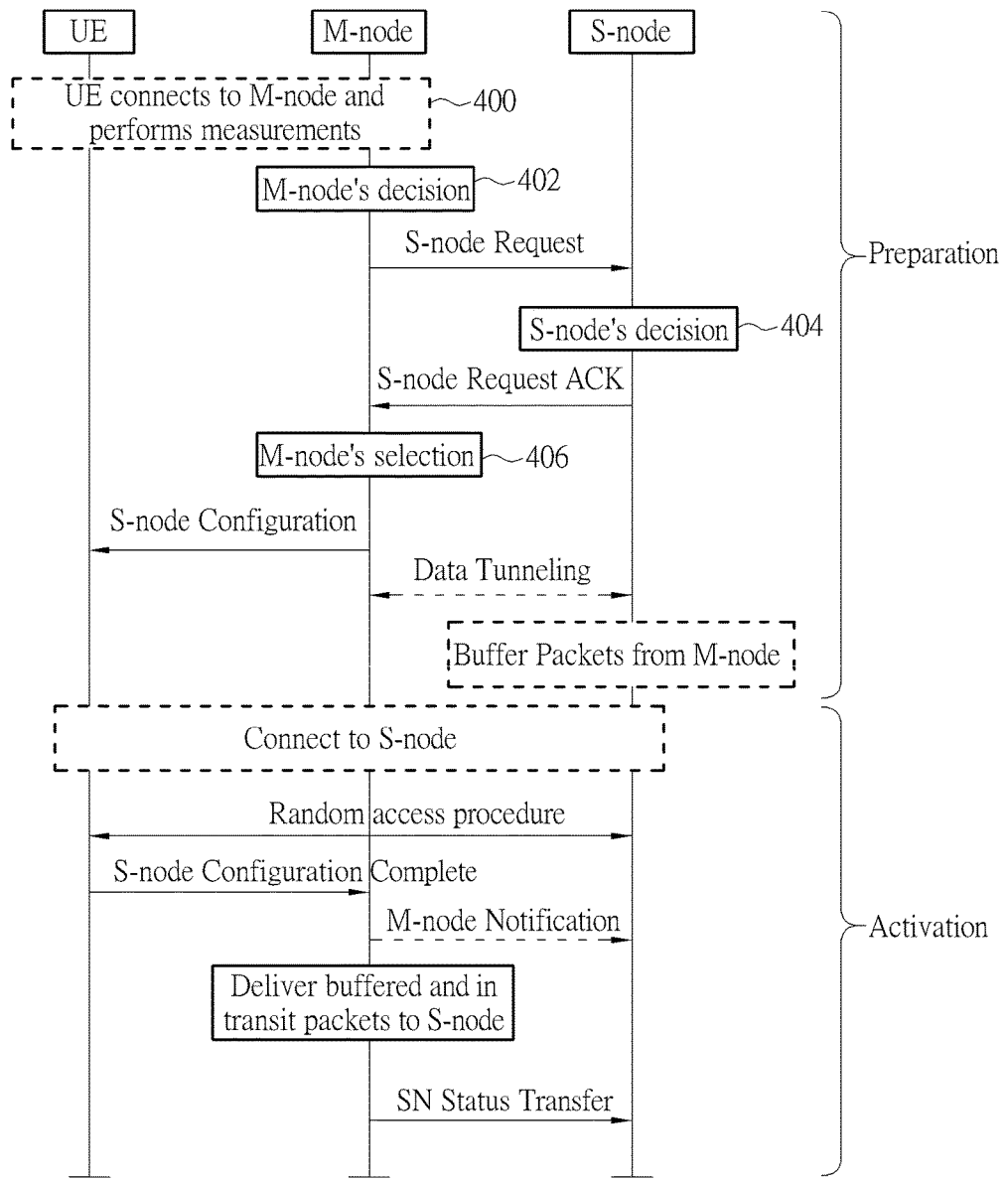
FIGS. 4-14 illustrate schematic diagrams of several exemplary embodiments.
Figure 5:
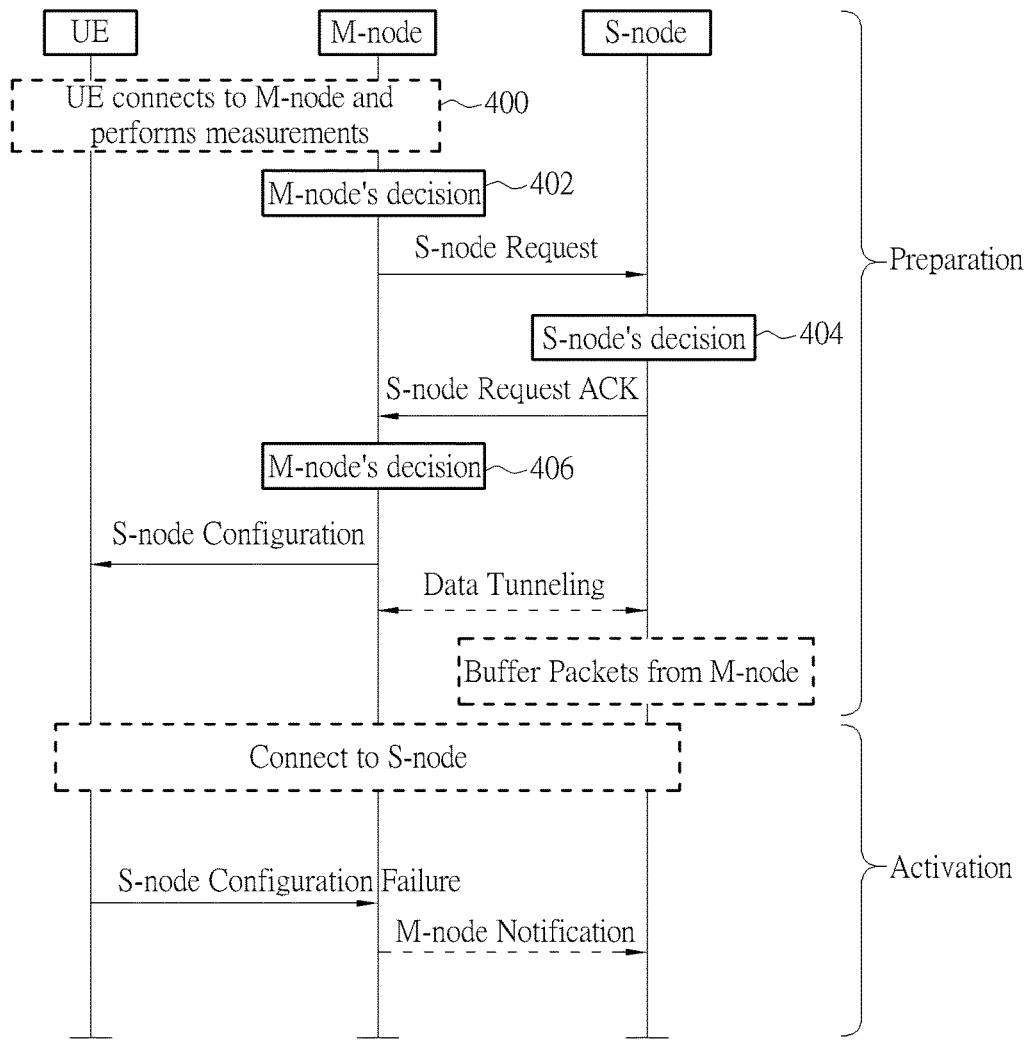

Take an example based on the process 30. Please refer to FIGS. 4-5. FIG. 4 is a schematic diagram of a RB establishment with S-node configuration completion. FIG. 5 is a schematic diagram of a RB establishment with S-node configuration failure. The RB establishment procedure in dual connectivity comprises phases of preparation and activation. In the phase of preparation, a UE connects to a M-node and sends a measurement report to the M-node (step 400). The measurement report may include the channel quality of S-nodes, e.g., RSRP, RSRQ. Therefore, the M-node may decide to establish, or release a subset of RBs for e UE on one or more than one S-node according to the measurement report (step 402). The M-node may send "S-node Request" message to one or more than one S-node, wherein the "S-node Request" message may include information of the RBs that the M-node would like to establish or release on the S-node. For example, the "S-node Request" message may include an E-RAB ID list and/or RB ID, E-RAB Level QoS Parameters, RB Level QoS Parameters. After the S-node receives the "S-node Request" message, the S-node may decide whether or not to accept the M-node's request (step 404). In addition, the S-node sends "S-node Request ACK" message to the M-node, wherein the "S-node Request ACK" message includes information about the S-nodes' decision for the RB which is accepted, rejected, or released. For example, the "S-node Request ACK" message may comprise an E-RAB ID list and/or RB ID, information related to the configurations of RBs on S-node, information related to connection setup to S-node. After the M-node receives "S-node Request ACK" message, the M-node may select one or more than one S-node for establishing the RBs (step 406). For example, the M-node may select one or more than one S-node to establish RBs according to S-nodes' ACK, M-node's preference, loading balance, and the combination thereof. The M-node may send "S-node Configuration" message including configurations of the S-node(s) to the UE for performing connection to the S-node(s). The "S-node Configuration" message may comprise cell list, physical cell ID, radio resource configuration for S-node (maybe include configurations of RB). In addition, the "S-node Configuration" message maybe included in a RRC connection reconfiguration message.

Moreover, the M-node and the S-node(s) may setup a connection for the data transmission and/or forwarding. The S-node(s) may buffer packets from the M-node.

In the phase of activation, the UE may perform synchronization (i.e. a random access procedure) to the S-node, and the S-node may respond with uplink resource allocation and uplink synchronization information, e.g., timing advance. In response to "S-node Configuration" message, the UE may send a message to notify the M-node whether or not the UE completes the S-node configuration. For example, the UE sends "S-node Configuration Complete" message to the M-node in FIG. 4, or sends "S-node Configuration Failure" message to the M-node in FIG. 5. Further, the M-node may send "M-node Notification" message to the S-node for activating the established RBs. The "M-node Notification" message may comprise an E-RAB ID list and/or RB ID.

Note that, the M-node may release the configurations of the RBs on M-node which are the same as the RBs established on the S-node.

In an embodiment, the S-node (s) which are not selected to activate the RBs may release the reserved resource according to the "M-node Notification" sent from the M-node to release the reserved resource. Or, the S-node (s) waits for a pre-determined period of time to release the reserved resource. For example, after the release timer expires, the S-node releases the reserved resource. In addition, the M-node may deliver buffered and in transit packets to the S-node(s) if the UE completes the S-node configuration. Or, the M-node may send a message to the S-nodes to convey the sequence number (SN) status if the UE completes the S-node configuration.

Figure 6:
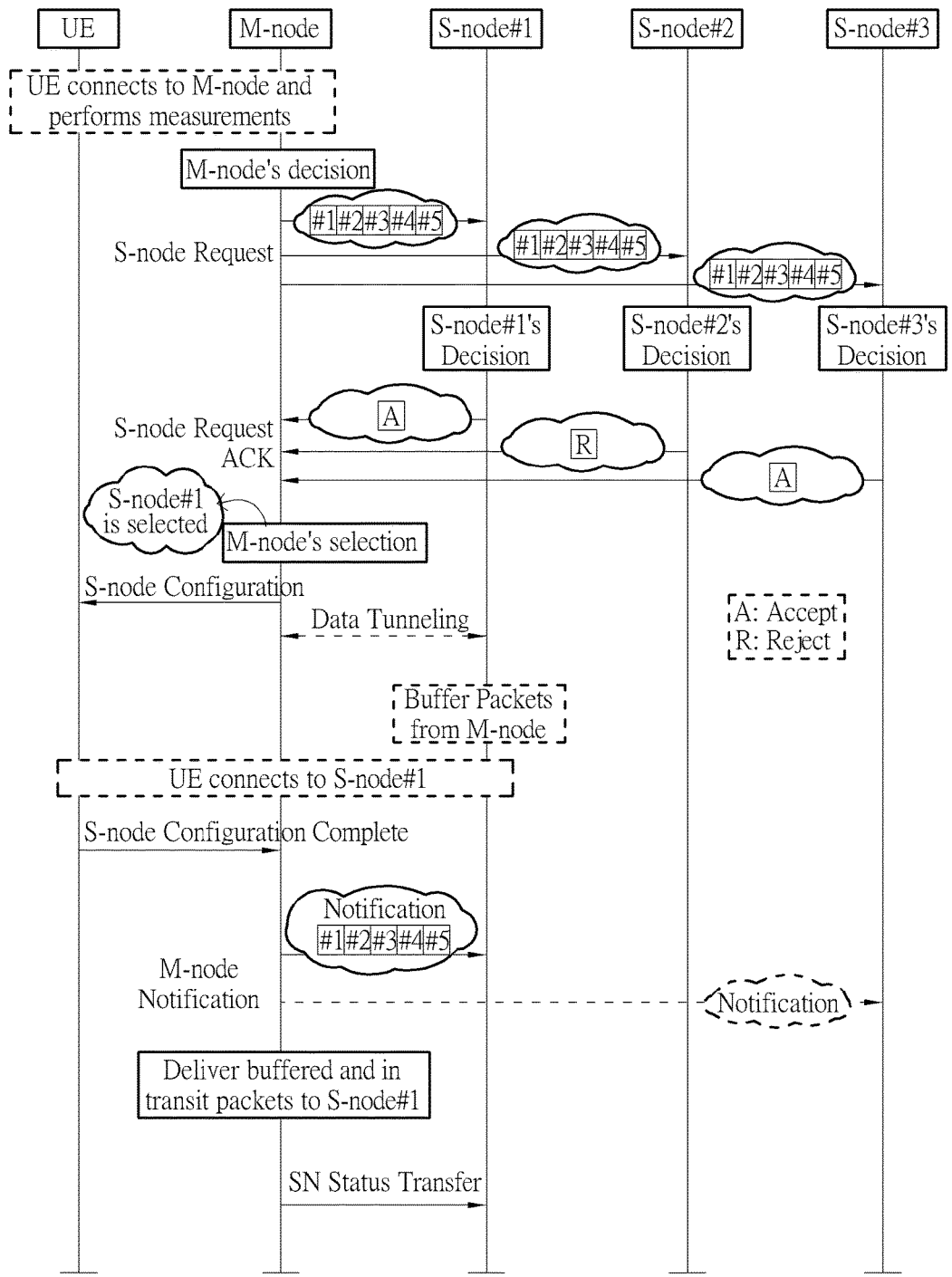

Please refer to FIG. 6, which illustrate a schematic diagram of a first exemplary embodiment for the RB establishment procedure. In the first embodiment, the M-node sends multiple "S-node Request" messages to the S-node#1-3 for asking whether or not to provide service for a subset of RBs for the UE. The "S-node Request" messages may include the same RB ID list or different RB ID list. In FIG. 6, the "S-node Request" message includes the same RB ID list, i.e. RB#1-5, to be established on the S-node#1-3. After receiving the "S-node Request" message, the S-node#1-3 may decide whether to accept or reject RB establishment on the S-node#1-3. The S-node#1-3 reply "S-node Request ACK" messages indicating whether to accept or reject the RB establishment, to the M-node. In this case, the S-node#1 accepts RB establishment, the S-node#2 rejects RB establishment, and the S-node#3 accepts RB establishment. After receiving the "S-node Request ACK" messages from the S-node#1-3, the M-node may select which S-node should establish RB. In this case, the M-node selects the S-node#1 to establish RB, and then sends the "S-node Configuration" message including configuration of the S-node#1 to the UE. Therefore, the UE connects to the S-node#1 according to the "S-node Configuration" message. The UE may send the "S-node Configuration Complete" message to the M-node if the UE completes configuration for the S-node#1. After receiving "S-node Configuration Complete" message, the M-node may send the "M-node Notification" message including RB IDs, i.e. RB#1-5, to the S-node#1 to activate the RB#1-5 on the S-node#1. Thus, the UE is able to transmit/receive data with RB#1-5 on the S-node#1, so as to increasing user's throughput. On the other hand, the M-node may optionally inform the other S-nodes, which is not selected by the M-node, to release the reserved resources with "M-node Notification" message. The "M-node Notification" message may include the RB ID to release the reserved resource. For example, in FIG. 6, the S-node#3 is informed to release the reserved resources with "M-node Notification" message. In other words, the RB-establishment is used for establishing RBs on at least a network node.

Figure 7:
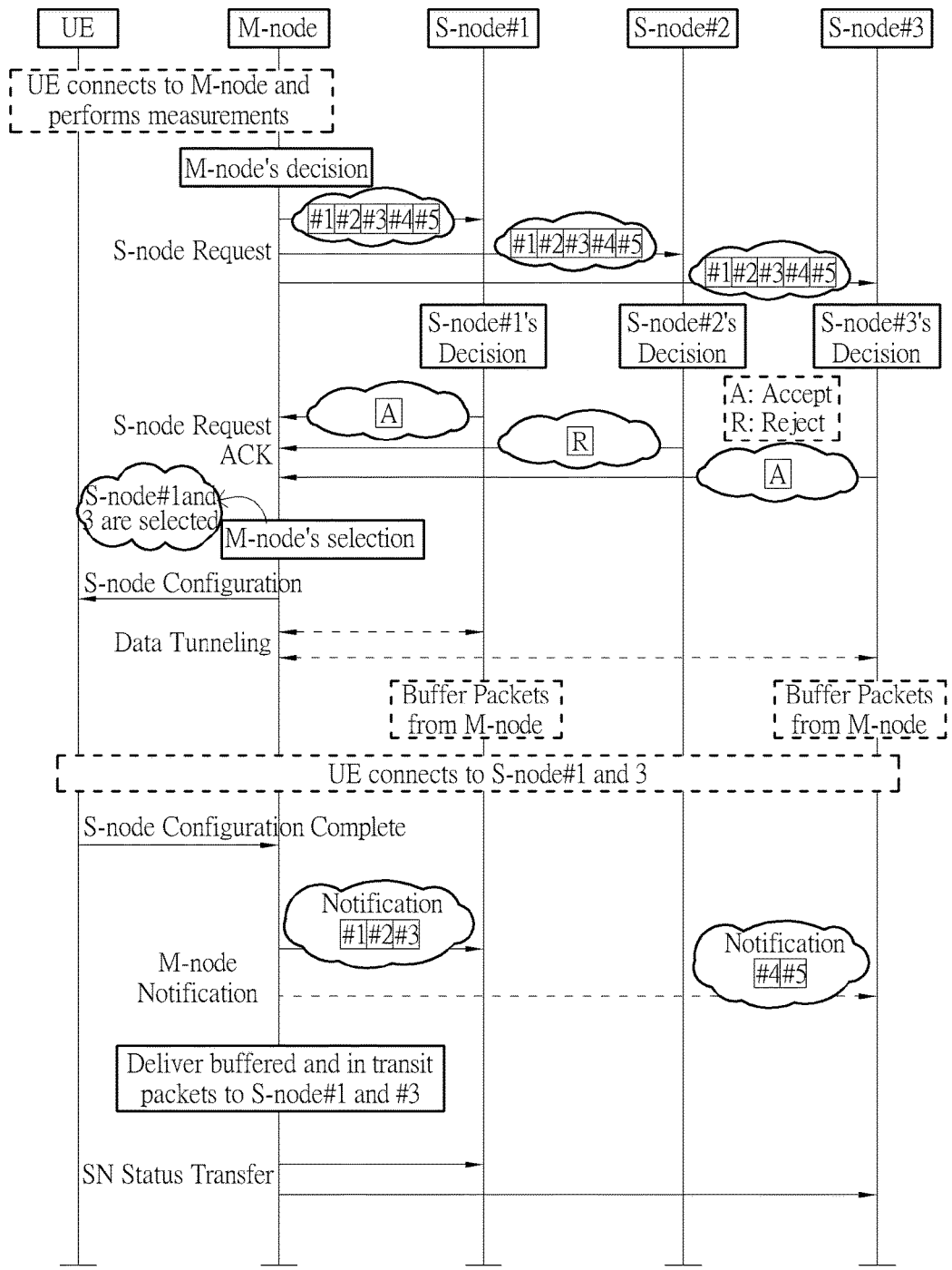

Please refer to FIG. 7, which illustrate a schematic diagram of a second exemplary embodiment for the RB establishment procedure. Similar to the first exemplary embodiment, the M-node may send multiple "S-node Request" messages to multiple S-nodes. The S-nodes may reply "S-node Request ACK" messages to the M-node. After receiving the "S-node Request ACK" message, the M-node may select the S-node#1 and S-node#3, and then send the "S-node Configuration" message to the UE. The UE may send the "S-node Configuration Complete" message to the M-node if completing configuration for the S-node#1 and S-node#3. The M-node may send the "M-node Notification" message including RB IDs, RB#1-3, to the S-node#1 to activate RB#1-3 on the S-node#1, and release the RB#4-5 on the S-node#1. In addition, the M-node sends "M-node Notification" message including RB IDs, RB#4-5, to S-node#3 to activate RB#4-5 on the S-node#3 and release RB#1-3 on the S-node#3.

Figure 8:
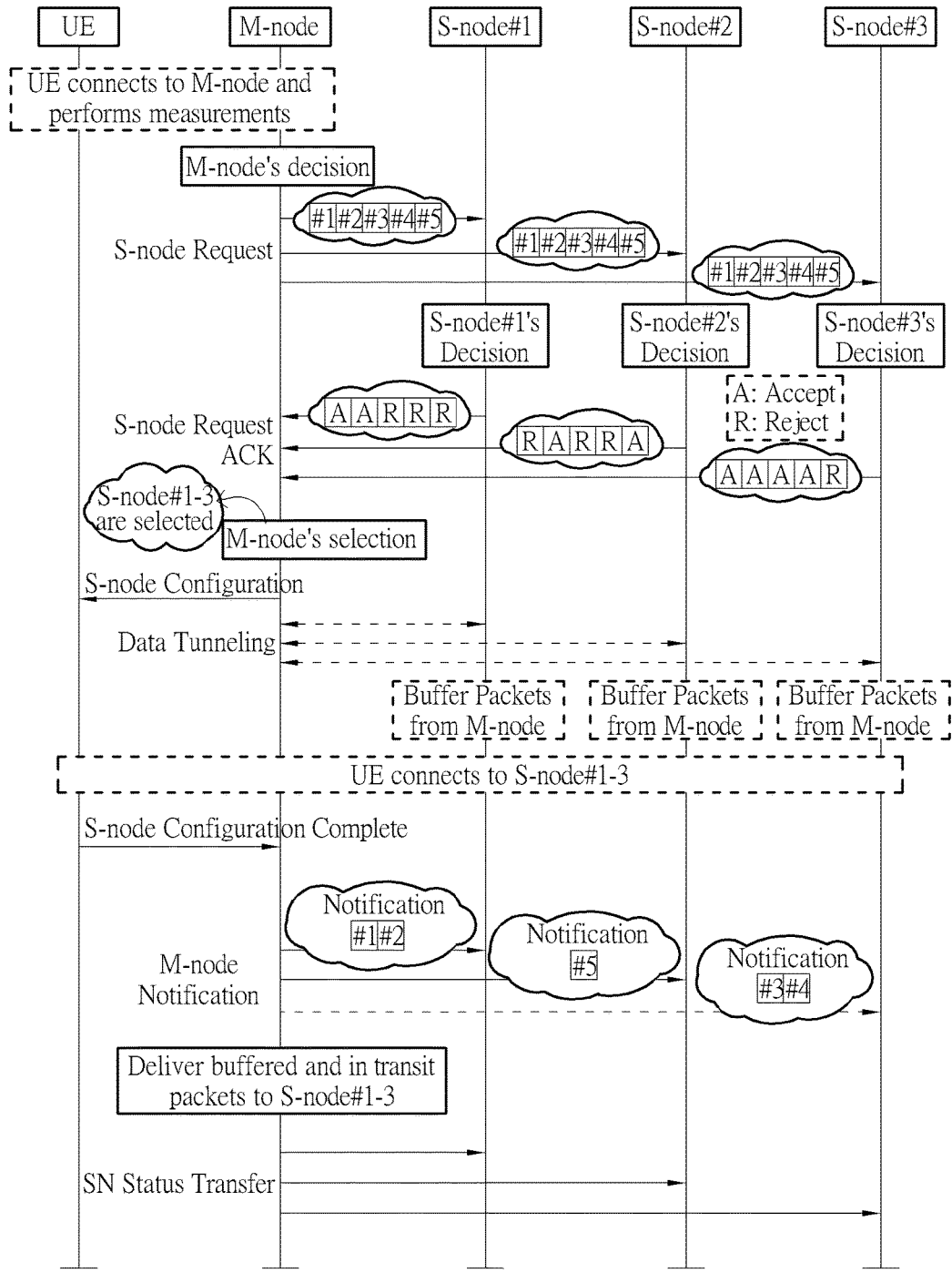

Please refer to FIG. 8, which illustrate a schematic diagram of a third exemplary embodiment for the RB establishment procedure. The M-node may send multiple "S-node Request" messages to multiple S-nodes. The S-nodes may reply "S-node Request ACK" message to accept or reject a subset of RB-establishment. The detailed description can be referred from above. Note that, the "S-node Request ACK" message may include a bit map to indicate establishment acceptance or rejection for each RB. For example, as shown in FIG. 8, S-node#1-3 respectively decides which RB could be established. The S-node#1 transmits "S-node Request ACK" message indicating that establishment for RB#1-2 is accepted and for RB#3-5 is rejected to the M-node. The S-node#2 transmits "S-node Request ACK" message indicating that establishment for RB#2/5 is accepted and for RB#1/3/4 is rejected, to the M-node. The S-node#3 transmits "S-node Request ACK" message indicating that establishment for RB#1-4 is accepted, and for RB#5 is rejected, to the M-node. As a result, the M-node knows which RB the S-node could establish. The M-node may select the S-node#1-3 to establish RBs. The M-node sends "M-node Notification" message including RB IDs, RB#1-2, to the S-node#1 to activate RB#1-2 on the S-node#1. The M-node sends "M-node Notification" message including RB IDs, RB#5, to S-node#2 to activate RB#5 on the S-node#2, and release RB#2 on the S-node#2. The M-node sends "M-node Notification" message including RB IDs, RB#3-4, to S-node#3 to activate RB#3-4 on the S-node#3 and release RB#1-2 on the S-node#3.

Figure 9:
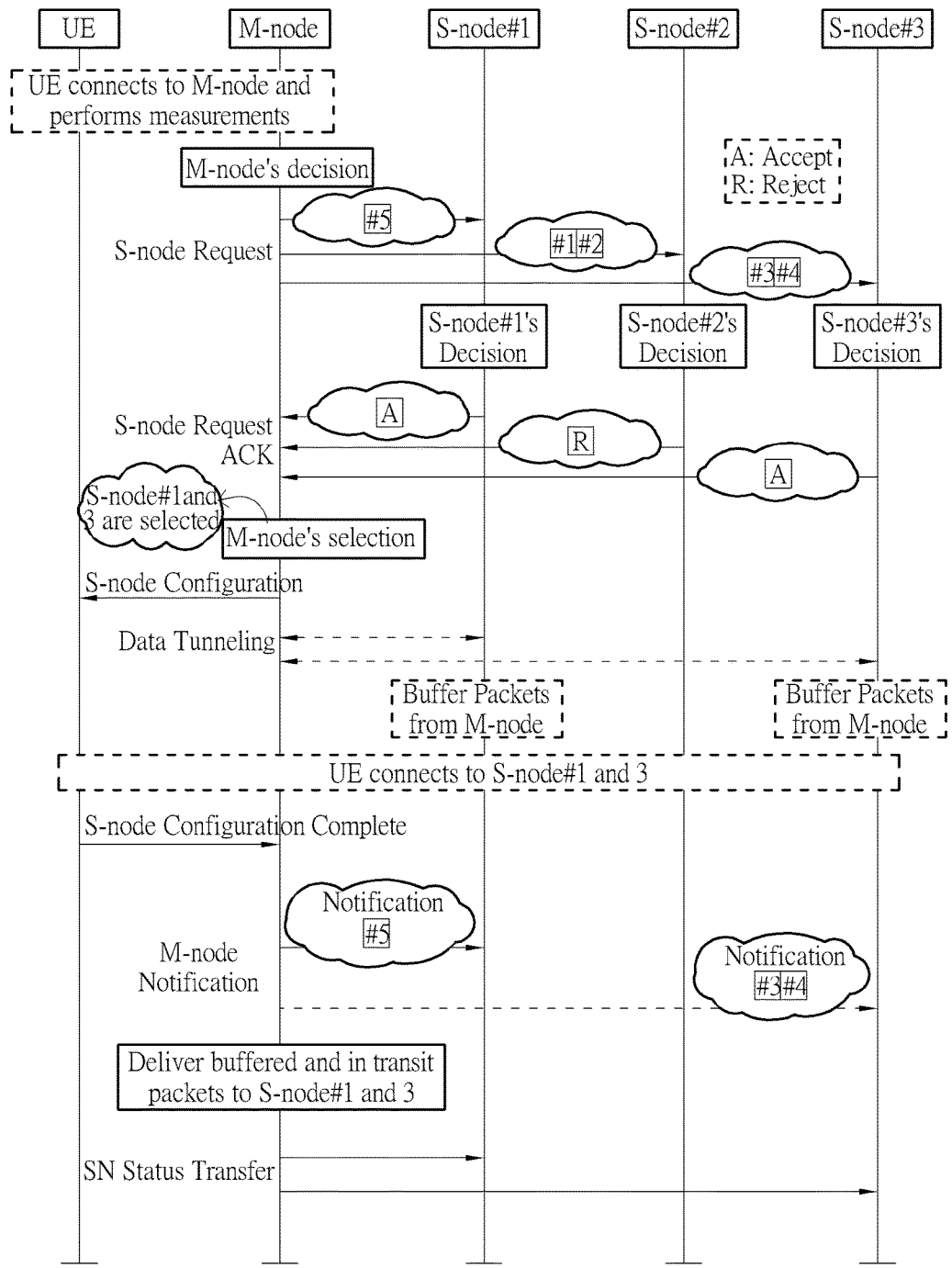

Please refer to FIG. 9, which illustrate a schematic diagram of a fourth exemplary embodiment for the RB establishment procedure. The M-node may send "S-node Request" messages including different RB ID list to the S-node#1-3. For example, the M-node sends the "S-node Request" message including RB#5 to the S-node#1, sends "S-node Request" message including RB#1-2 to the S-node#2, and sends "S-node Request" message including RB#3-4 to the S-node#3. The S-node#1 may accept establishment for RB#5, and transmits the "S-node Request ACK" message to notify the M-node. The S-node#2 may reject establishment for RB#1-2, and transmit the "S-node Request ACK" message to notify the M-node. The S-node#3 may accept establishment for RB#3-4, and transmits "S-node Request ACK" message to notify the M-node. After the M-node receives the "S-node Request ACK" message from the S-node#1-3, the M-node may select the S-node#1 and S-node#3 for RB establishment. The M-node further sends the "M-node Notification" message including RB IDs, RB#5, to S-node#1 to activate RB#5 on the S-node#1, and sends "M-node Notification" message including RB IDs, RB#3-4, to S-node#3 to activate RB#3-4 on the S-node#3.

Figure 10:
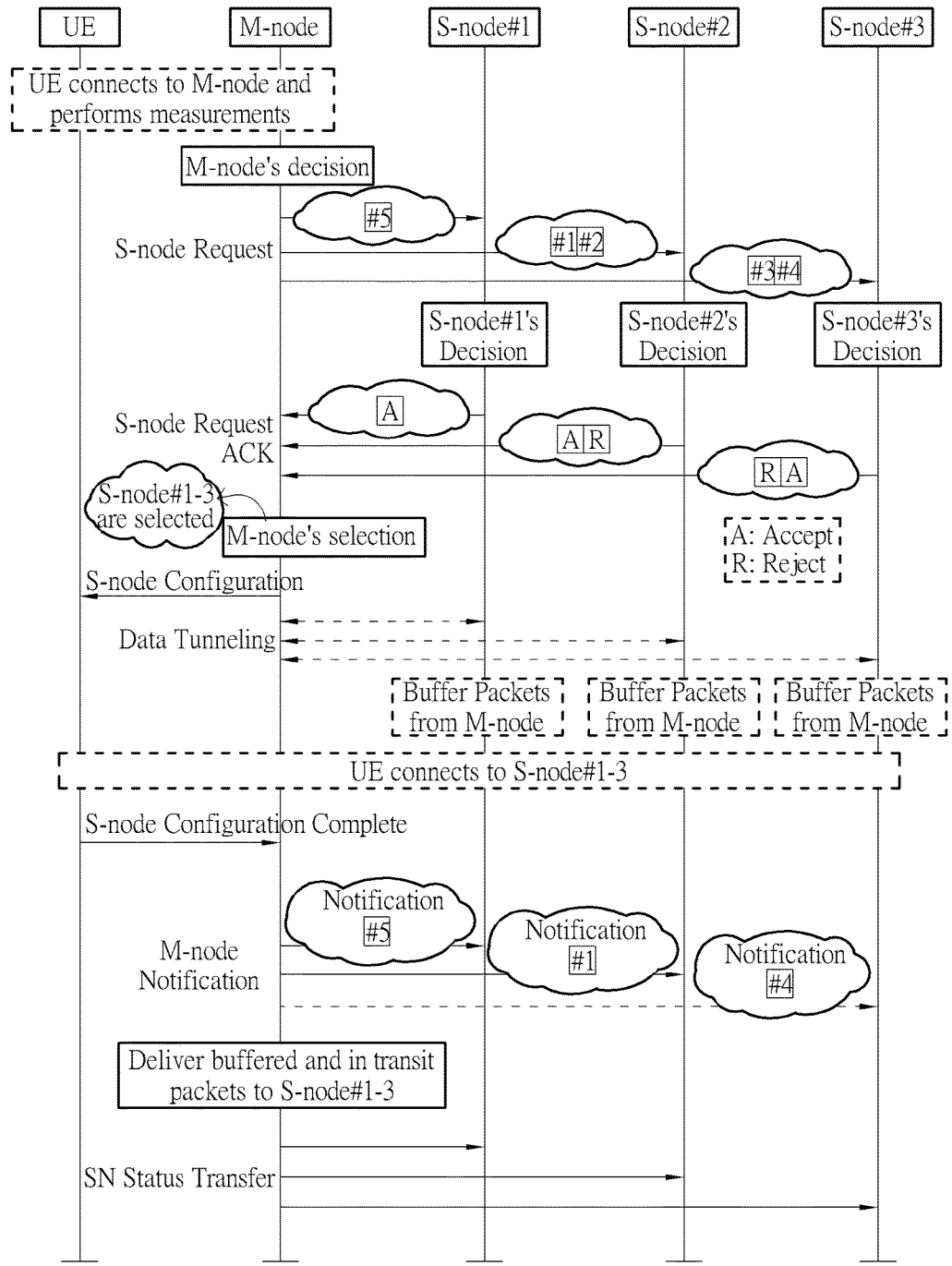

Please refer to FIG. 10, which illustrate a schematic diagram of a fifth exemplary embodiment for the RB establishment procedure. The M-node sends the "S-node Request" message including RB#5 to the S-node#1, the "S-node Request" message including RB#1-2 to the S-node#2, and the "S-node Request" message including RB#3-4 to the S-node#3. The S-node#1-3 may decide which RB could be served. In this case, the S-node#1 may accept RB#5, the S-node#2 may accept RB#1 and reject RB#2, and the S-node#3 may accept RB#4 and reject RB#3. Note that, similar to the third exemplary embodiment in FIG. 8, the "S-node Request ACK" message include a bit map to indicate establishment acceptance or rejection for each RB. The detailed description can be referred from above. After receiving "S-node Request ACK" messages from the S-node#1-3, the M-node may select S-node#1-3 for RB establishment. In addition, the M-node may send the "M-node Notification" message including RB IDs, RB#5, to S-node#1 to activate RB#5, sends "M-node Notification" message including RB IDs, RB#1, to S-node#2 to activate RB#1, and sends "M-node Notification" message including RB IDs, RB#4, to S-node#3 to activate RB#4.

Figure 11:
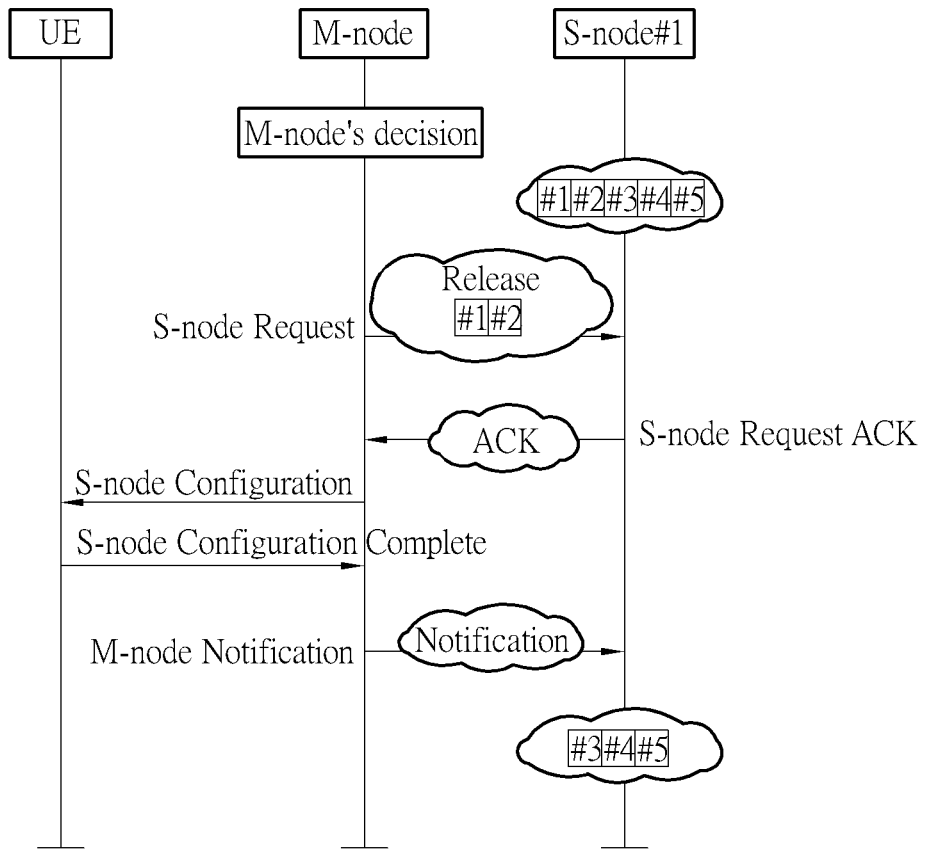

Please refer to FIG. 11, which illustrate a schematic diagram of a sixth exemplary embodiment for the RB establishment procedure. The M-node may ask S-node#1 to establish back or release a subset of RBs with the "S-node Request" message. The S-nodes may reply with "S-node Request ACK" message to the M-node. For example, as shown in FIG. 11, the S-node#1 provides service for RB#1-5 for the UE. The M-node may send "S-node Request" message including RB#1-2 to the S-node#1 for releasing RB#1-2. Therefore, the S-node#1 merely provides service for RB#3-5 for the UE. On the other hand, the M-node may establish RB#1-2 on itself.

Figure 12:
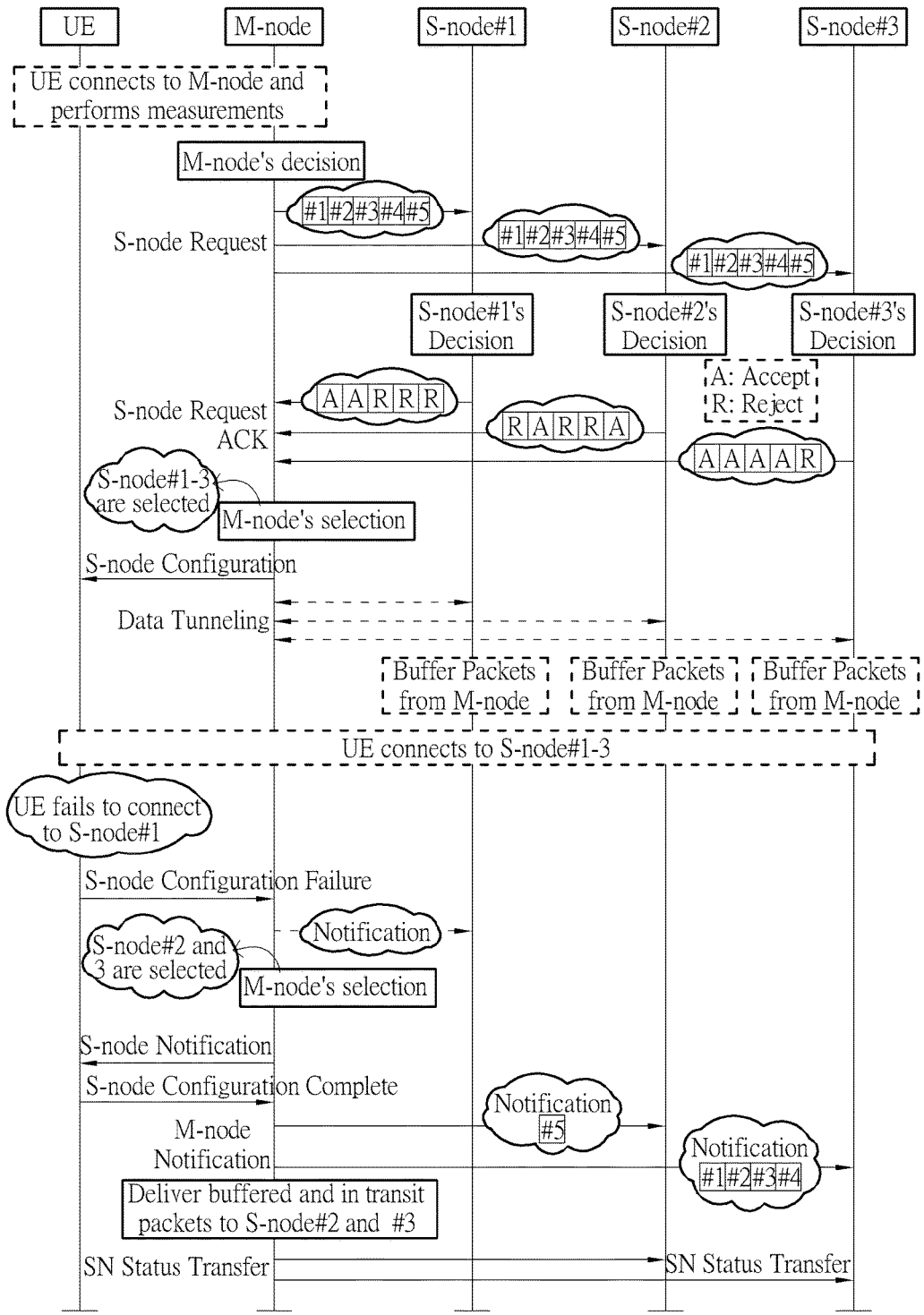

Please refer to FIG. 12, which illustrate a schematic diagram of a seventh exemplary embodiment for the RB establishment procedure. The M-node sends "S-node Request" messages each including RB#1-5 to be established on the S-node#1-3, to the S-node#1-3. The S-nodes#1-3 may decide which RB could be served. In this case, the S-node#1 may accept RB#1-2 and reject RB#3-5, the S-node#2 may accept RB#2/5 and reject RB#1/3/4, and the S-node#3 may accept RB#1-4 and reject RB#5. The M-node may select S-node#1-3 to establish RBs, and then sends configuration of the S-node#1-3 to the UE. If the UE fails to complete the S-node configuration for S-node#1, the M-node may send the "M-node Notification" message to the S-node#1 to indicate the reserved RB(s) to be released. In addition, the M-node may re-send the "S-node Configuration" message to the UE for performing connection to the S-node#2-3. After the configuration for the S-node#2-3 is completed, the M-node send the "M-node Notification" message including RB IDs, RB#5, to S-node#2 to activate RB#5 and release RB#2, and sends "M-node Notification" message including RB IDs, RB#1-4, to S-node#3 to activate RB#1-4.

Figure 13:
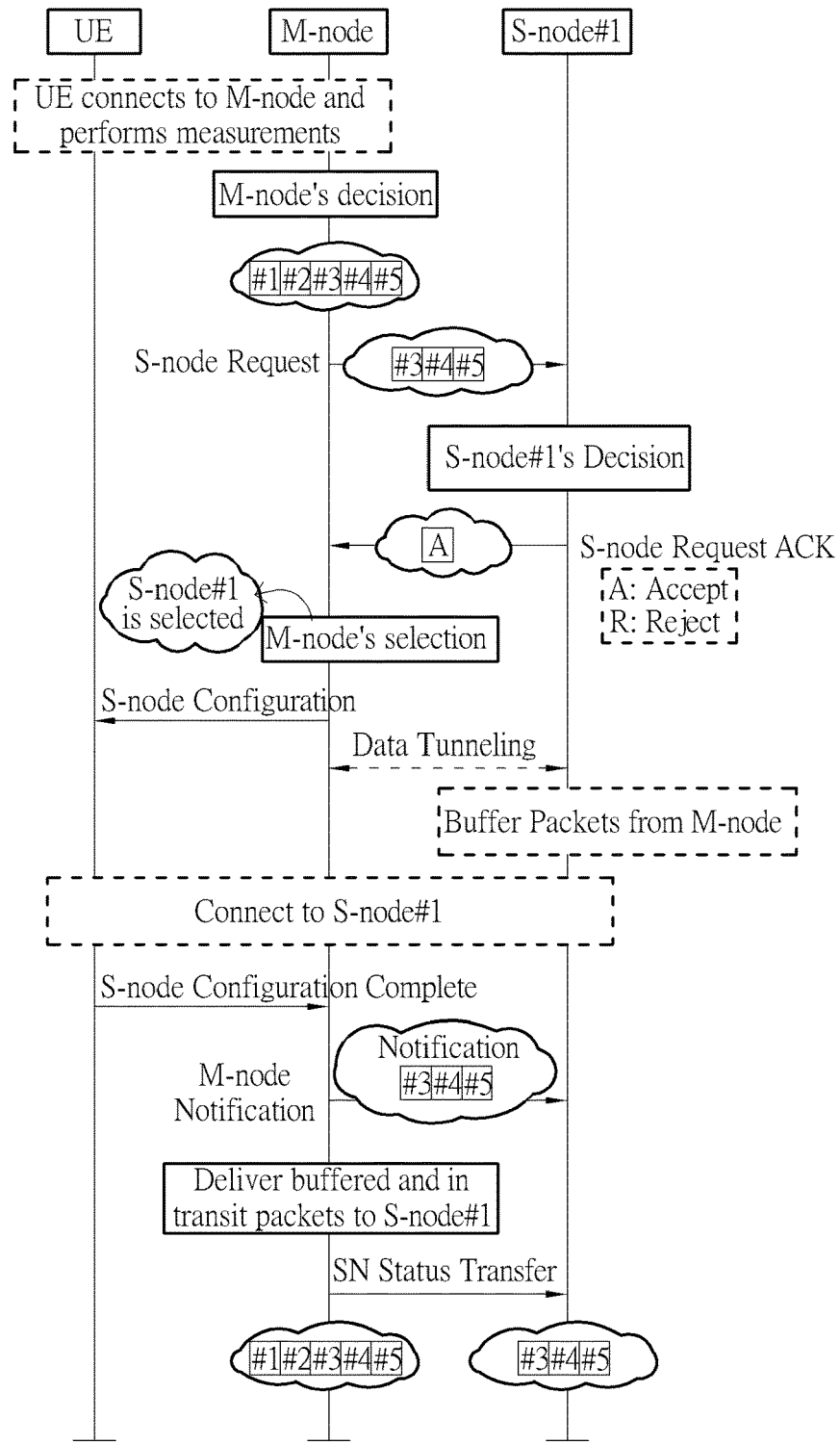

Please refer to FIG. 13, which illustrate a schematic diagram of an eighth exemplary embodiment for the RB establishment procedure. The RB-establishment procedure may switch part of RBs from the M-node to S-node. i.e., an RB of a UE may be maintained on M-node and S-node simultaneously. The data corresponding to this RB could be transmitted through M-node and S-node. In other words, the M-node may not release the configuration of the RB(s) which are established to S-node. For example, as shown in FIG. 13, the M-node may provide service for RB#1-5. The M-node may ask S-node#1 whether or not to provide service for a subset of RBs of the UE with "S-node Request" message, wherein the "S-node Request" message including RB#3-5. The S-node#1 may decide whether to accept the RB establishment request. The S-node#1 may accept RB#3-5 and sends "S-node Request ACK" message to the M-node. The M-node may select S-node#1, and send the "M-node Notification" message including RB IDs, RB#3-5 to the S-node#1 to activate RB#3-5. Therefore, both of the M-node and S-node#1 may provide service for RB#3-5.

Figure 14:
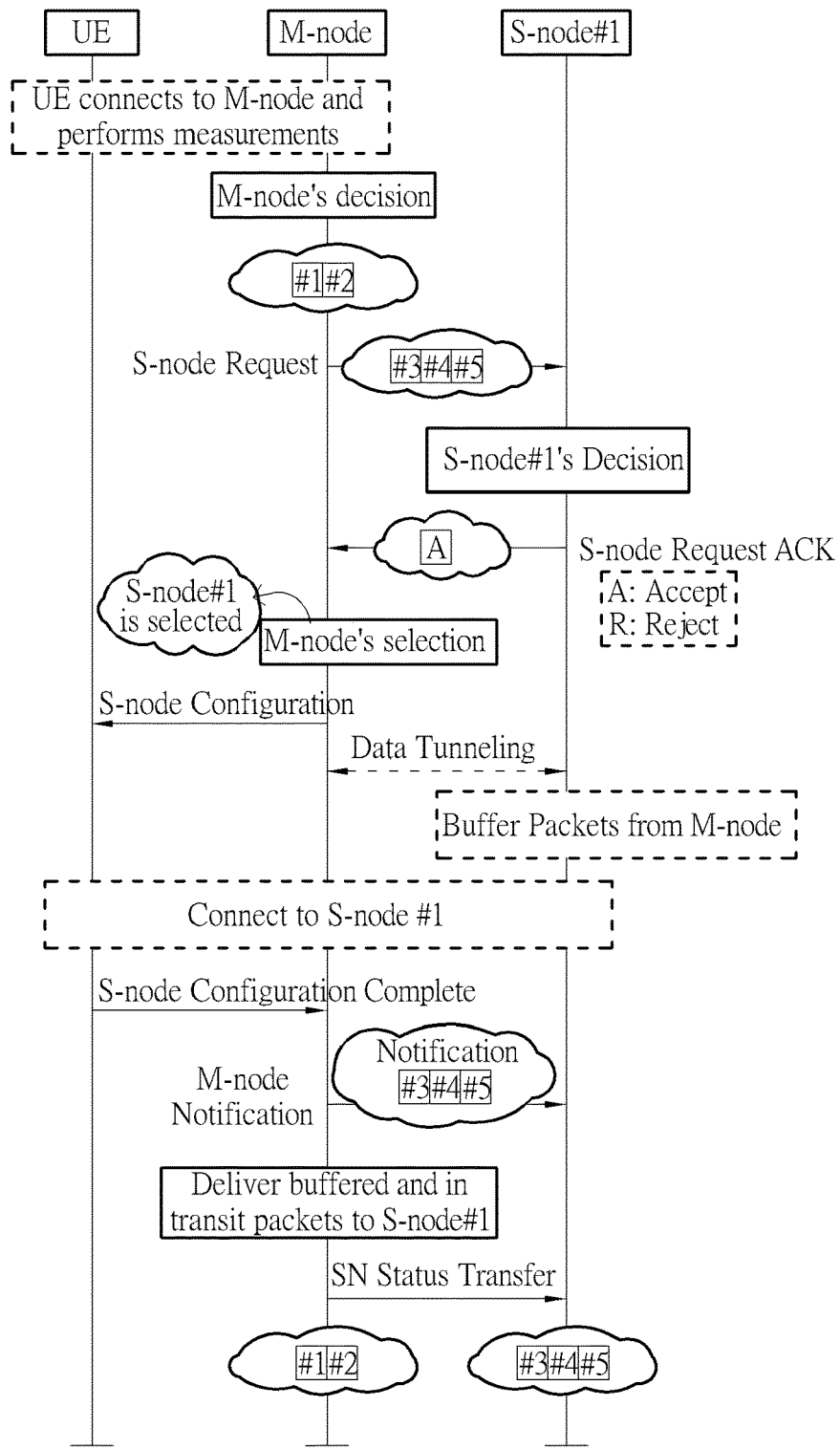

Please refer to FIG. 14, which illustrate a schematic diagram of a ninth exemplary embodiment for the RB establishment procedure. The RB-establishment procedure may establish part of data transmission of a RB on S-node, i.e., an RB of a UE may be maintained on S-node only. The data corresponding to this RB could be transmitted through M-node and S-node. In this case, M-node may not maintain the configuration of the RB(s) which are established to S-node. For example, as shown in FIG. 14, the M-node may ask S-node#1 whether or not to provide service for a subset of RBs of a UE with "S-node Request" message including RB#3-5. The S-node#1 may decide which RB could be served. In this case, the S-node#1 accepts RB#3-5. The M-node may send the "M-node Notification" message including RB IDs, RB#3-5, to S-node#1 to activate RB#3-5. Thus, the S-node#1 may provide service for RB#3-5. As can be seen, the RB establishment procedure of the present invention may establish a new RB on a network node (i.e. S-node).

Figure 15:
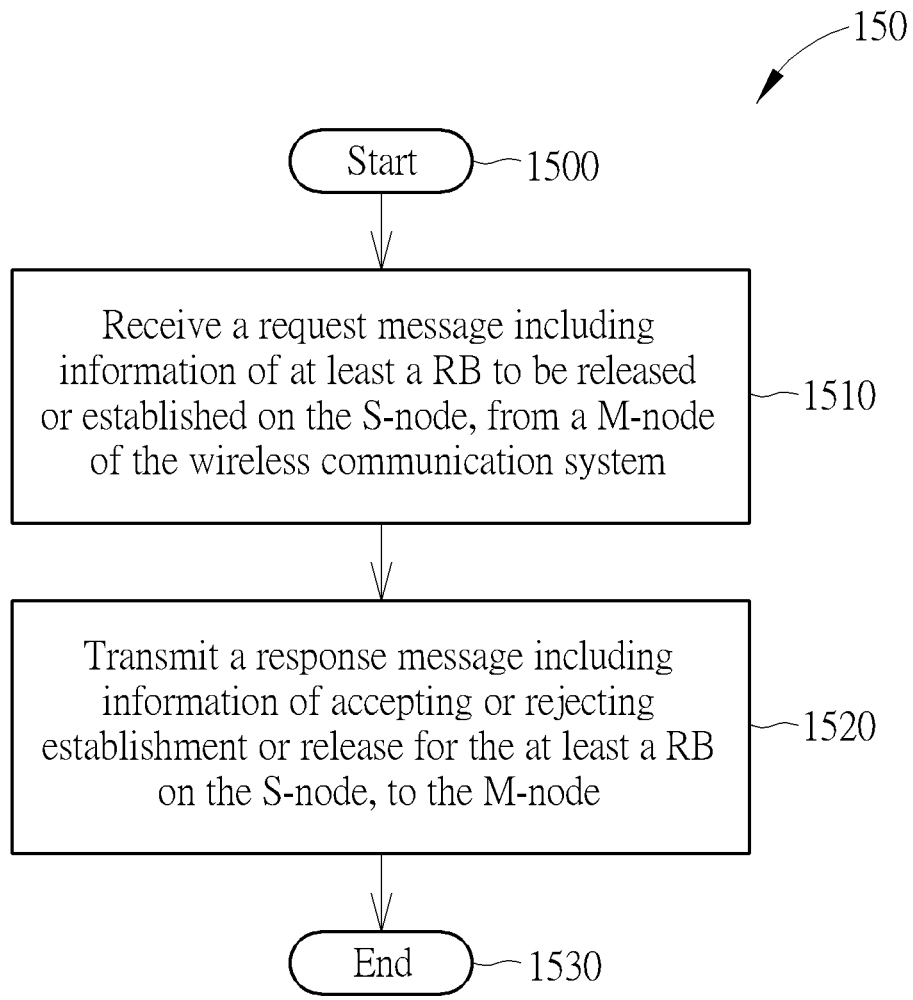
FIGS. 15-16 are flowcharts of exemplary processes according to the present disclosure.

Please refer to FIG. 15, which is a flowchart of a process 150 according to an example of the present disclosure. The process 150 is utilized in the communication device 20 (i.e. the S-node in FIG. 1) for RB establishment in dual connectivity. The process 150 may be compiled into a program code 214 to be stored in the storage unit 210, and may include the following steps:

Step 1500: Start.

Step 1510: Receive a request message including information of at least a RB to be released or established on the S-node, from a M-node of the wireless communication system.

Step 1520: Transmit a response message including information of accepting or rejecting establishment or release for the at least a RB on the S-node, to the M-node.

Step 1530: End.

According to the process 150, the S-node receives the "S-node Request" message indicating RBs to be released or established on the S-node, from the M-node. The S-node determines whether to accept or reject the RB release or establishment, and then responds with "S-node Request ACK" message to the M-node. Note that, the "S-node Request" message may include the same or different RB ID list. The "S-node Request ACK" message may include a bit map to indicate establishment acceptance or rejection for each RB. The detailed operation can be referred from above, so it is omitted herein.

Figure 16:
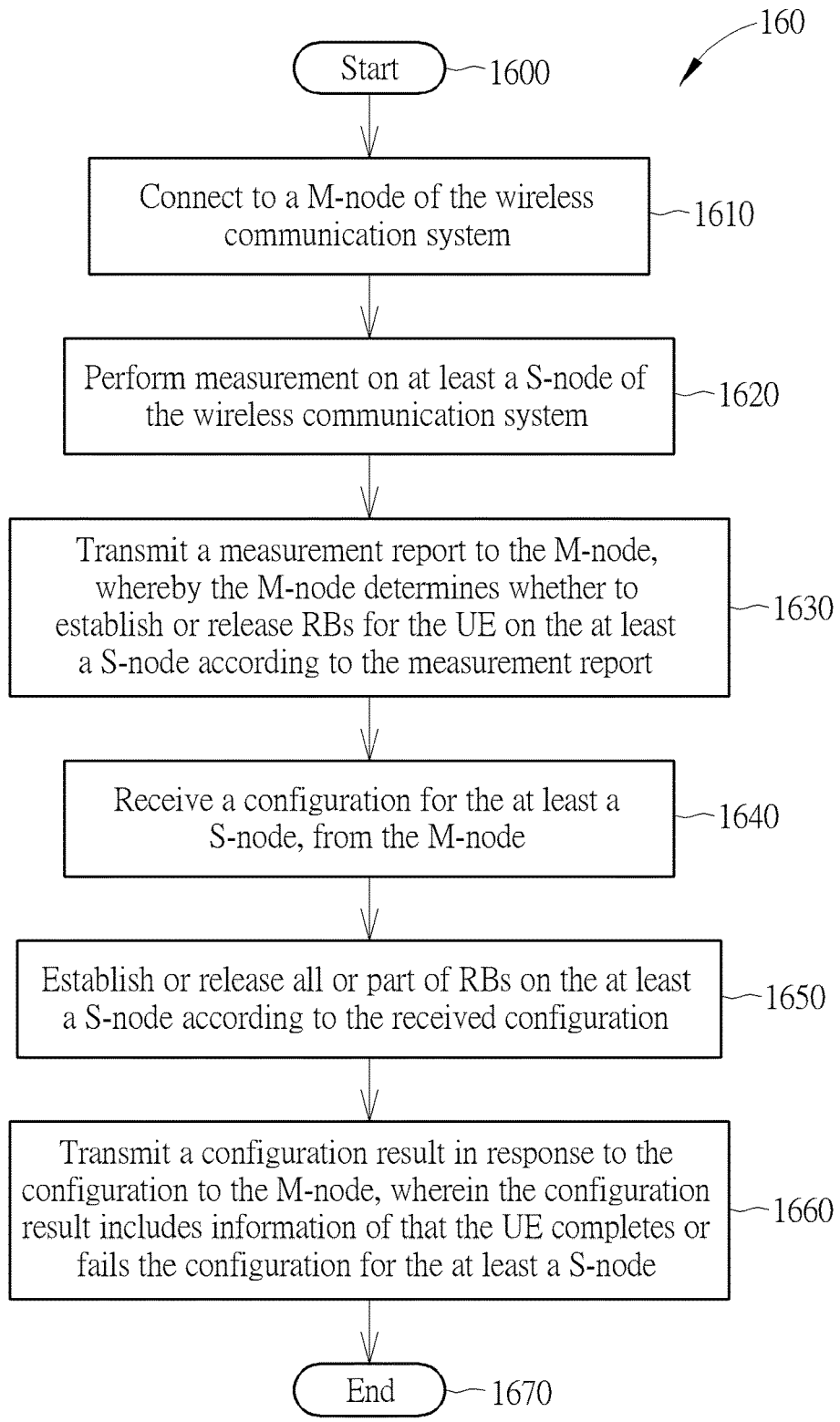

Please refer to FIG. 16, which is a flowchart of a process 160 according to an example of the present disclosure. The process 160 is utilized in the communication device 20 (i.e. the UE in FIG. 1) for RB establishment in dual connectivity. The process 160 may be compiled into a program code 214 to be stored in the storage unit 210, and may include the following steps:

Step 1600: Start.

Step 1610: Connect to a M-node of the wireless communication system.

Step 1620: Perform measurement on at least a S-node of the wireless communication system.

Step 1630: Transmit a measurement report to the M-node, whereby the M-node determines whether to establish or release RBs for the UE on the at least a S-node according to the measurement report.

Step 1640: Receive a configuration for the at least a S-node, from the M-node.

Step 1650: Establish or release all or part of RBs on the at least a S-node according to the received configuration.

Step 1660: Transmit a configuration result in response to the configuration to the M-node, wherein the configuration result includes information of that the UE completes or fails the configuration for the at least a S-node.

Step 1670: End.

According to the process 160, the UE receives "S-node Configuration" message from the M-node, and then performs connection to S-node according to the information of "S-node Configuration" message. If the UE completes the configuration for the S-node, the UE transmits "S-node Configuration Complete" message to the M-node. If the UE fails to complete the configuration for the S-node, the UE transmits "S-node Configuration Failure" to the M-node. Therefore, the M-node knows whether to activate or release the RBs on the S-node accordingly.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, the present invention provides RB establishment procedure in dual connectivity, so as to establish at least a new RB on a network node, switch all or part of RBs on a network node to another network node (i.e. from the M-node to S-node). Therefore, data transmission/reception to/from more than one network nodes is realized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of radio bearer establishment in dual connectivity, for a first base station in a wireless communication system, comprising:
   connecting to a communication device of the wireless communication system;
   determining whether to establish or release at least a radio bearer for the communication device on at least a second base station;
   transmitting a request message including information of the at least a radio bearer to be established or released on the at least a second base station, to the at least a second base station; and
   receiving a response message including information about accepting or rejecting establishment or release for the at least a radio bearer on the at least a second base station, from the at least a second base station, wherein the response message includes information of at least one of identities of radio bearers to be accepted or rejected to be established or released, release acknowledgement, information related to configuration of radio bearers on the at least a second base station, and information related to connection setup to the at least a second base station.

2. The method of claim 1, further comprising:
   transmitting a configuration for the at least a second base station, to the communication device; and
   receiving a configuration result in response to the configuration from the communication device, wherein the configuration result includes information of that communication device completes or fails the configuration for the at least a second base station.

3. The method of claim 2, wherein the configuration includes information of at least one of cell list, cell identity and radio resource configuration for the at least a second base station.

4. The method of claim 1, further comprising:
   transmitting a notification message including information of at least a radio bearer to be activated or released, to the at least a second base station.

5. The method of claim 4, wherein the notification message includes information of at least one of identities of the at least a radio bearer to be established or released on the at least a second base station.

6. The method of claim 1, wherein the request message includes information of at least one of identities of the at least a radio bearer to be released or established on the at least a second base station, and radio bearer level QoS parameters.

7. The method of claim 1, further comprising:
   receiving a measurement report from the communication device, wherein the measurement report includes measurement that the communication device performed on the at least a second base station of the wireless communication system;
   wherein determines whether to establish or release the at least a radio bearer for the communication device on the at least a second base station comprises:
      determines whether to establish or release the at least a radio bearer for the communication device on the at least a second base station according to the measurement report.

8. A first base station of a wireless communication system for radio bearer establishment in dual connectivity, the first base station comprising:
   a storage unit for storing instructions of:
      connecting to a communication device of the wireless communication system;
      determining whether to establish or release at least a radio bearer for the communication device on at least a second base station; and
      transmitting a request message including information of the at least a radio bearer to be established or released on the at least a second base station, to the at least a second base station; and
      receiving a response message including information about accepting or rejecting establishment or release for the at least a radio bearer on the at least a second base station, from the at least a second base station, wherein the response message includes information of at least one of identities of radio bearers to be accepted or rejected to be established or released, release acknowledgement, information related to configuration of radio bearers on the at least a second base station, and information related to connection setup to the at least a second base station.

9. The first base station of claim 8, wherein the storage unit further stores an instruction of:
   transmitting a configuration for the at least a second base station, to the communication device; and receiving a configuration result in response to the configuration from the communication device, wherein the configuration result includes information of that communication device completes or fails the configuration for the at least a second base station; and a processing means, coupled to the storage unit, configured to execute the instructions stored in the storage unit.

10. The first base station of claim 9, wherein the configuration includes information of at least one of cell list, cell identity and radio resource configuration for the at least a second base station.

11. The first base station of claim 8, wherein the storage unit further stores an instruction of:

transmitting a notification message including information of at least a radio bearer to be activated or released, to the at least a second base station.

12. The first base station of claim 11, wherein the notification message includes information of at least one of identities of the at least a radio bearer to be established or released on the at least a second base station.

13. The first base station of claim 8, wherein the request message includes information of at least one of identities of the at least a radio bearer to be released or established on the at least a second base station, and radio bearer level QoS parameters.

14. The first base station of claim 8, wherein the storage unit further stores an instruction of:

receiving a measurement report from the communication device, wherein the measurement report includes measurement that the communication device performed on the at least a second base station of the wireless communication system;

wherein the step of determining whether to establish or release the at least a radio bearer for the communication device on the at least a second base station comprises:

determining whether to establish or release the at least a radio bearer for the communication device on the at least a second base station according to the measurement report.

* * * * *